United States Patent
Tajalli

(10) Patent No.: US 10,812,298 B2
(45) Date of Patent: Oct. 20, 2020

(54) METHODS AND SYSTEMS FOR PROVIDING MULTI-STAGE DISTRIBUTED DECISION FEEDBACK EQUALIZATION

(71) Applicant: Kandou Labs, S.A., Lausanne (CH)

(72) Inventor: Armin Tajalli, Salt Lake City, UT (US)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/444,951

(22) Filed: Jun. 18, 2019

(65) Prior Publication Data

US 2019/0305991 A1 Oct. 3, 2019

Related U.S. Application Data

(63) Continuation of application No. 15/835,648, filed on Dec. 8, 2017, now Pat. No. 10,326,623.

(51) Int. Cl.
*H03H 7/40* (2006.01)
*H04L 25/03* (2006.01)
*H04L 25/06* (2006.01)

(52) U.S. Cl.
CPC .. *H04L 25/03038* (2013.01); *H04L 25/03057* (2013.01); *H04L 25/03267* (2013.01); *H04L 25/067* (2013.01); *H04L 2025/0349* (2013.01)

(58) Field of Classification Search
CPC ......... H04L 25/03038; H04L 25/03037; H04L 2025/0272; G11C 7/065; G11C 7/1087
USPC .................. 375/232, 229, 233; 708/322, 323
See application file for complete search history.

(56) References Cited

U.S. PATENT DOCUMENTS

| | | |
|---|---|---|
| 3,992,616 A | 11/1976 | Acker |
| 7,339,990 B2 | 3/2008 | Hidaka |
| 7,539,243 B1 | 5/2009 | Toifl et al. |
| 7,869,497 B2 | 1/2011 | Benvenuto et al. |
| 7,873,115 B2 | 1/2011 | Zerbe et al. |
| 8,472,513 B2 | 6/2013 | Malipatil et al. |
| 8,791,735 B1 | 7/2014 | Shibasaki |

(Continued)

FOREIGN PATENT DOCUMENTS

KR 0340178 B1 6/2002

OTHER PUBLICATIONS

International Search Report and Written Opinion of the International Searching Authority for PCT/US2018/064565, dated May 21, 2019, 1-12 (12 pages).

(Continued)

*Primary Examiner* — Khai Tran
(74) *Attorney, Agent, or Firm* — Invention Mine LLC

(57) ABSTRACT

Pre-charging two or more sets of nodes to set a differential output of a multi-input summation latch connected to the two or more sets of nodes in a pre-charged state, the two or more sets of nodes comprising a set of data signal nodes and a set of DFE correction nodes, in response to a sampling clock, generating a differential data voltage and an aggregate differential DFE correction signal, and generating a data decision by driving the differential output of the multi-input summation latch into one of two possible output states according to a summation of the differential data voltage signal and the aggregate differential DFE correction signal and subsequently holding the data decision by holding the differential output of the multi-input summation latch in a latched state for a duration determined by the sampling clock.

20 Claims, 15 Drawing Sheets

(56) References Cited

U.S. PATENT DOCUMENTS

| | | |
|---|---|---|
| 9,083,576 B1 | 7/2015 | Hormati |
| 9,300,503 B1 | 3/2016 | Holden et al. |
| 9,397,868 B1 | 7/2016 | Hossain et al. |
| 9,438,409 B1 | 9/2016 | Liao et al. |
| 9,520,883 B2 | 12/2016 | Shibasaki |
| 9,571,309 B1 | 2/2017 | Sakai |
| 10,193,716 B2 | 1/2019 | Hormati et al. |
| 10,326,623 B1 * | 6/2019 | Tajalli ............... H04L 25/03038 |
| 10,372,665 B2 | 8/2019 | Tajalli |
| 2006/0233291 A1 | 10/2006 | Garlepp et al. |
| 2008/0069198 A1 | 3/2008 | Bhoja et al. |
| 2008/0198916 A1 | 8/2008 | Zeng et al. |
| 2010/0020862 A1 | 1/2010 | Peng |
| 2011/0268225 A1 | 11/2011 | Cronie et al. |
| 2011/0286497 A1 | 11/2011 | Nervig |
| 2012/0082203 A1 | 4/2012 | Zerbe et al. |
| 2012/0213267 A1 | 8/2012 | Stojanovic et al. |
| 2012/0327993 A1 | 12/2012 | Palmer |
| 2013/0214865 A1 | 8/2013 | Bulzacchelli et al. |
| 2013/0322512 A1 | 12/2013 | Francese et al. |
| 2014/0286381 A1 | 9/2014 | Shibasaki |
| 2015/0117579 A1 | 4/2015 | Shibasaki |
| 2015/0180642 A1 | 6/2015 | Hsieh et al. |
| 2015/0319015 A1 | 11/2015 | Malhotra |
| 2016/0056980 A1 | 2/2016 | Wang et al. |
| 2017/0019276 A1 | 1/2017 | Francese |
| 2017/0373889 A1 | 12/2017 | Sakai |
| 2019/0199557 A1 * | 6/2019 | Taylor ............... G11C 7/1048 |

OTHER PUBLICATIONS

Chi, Hyung-Joon, et al., "A Single-Loop SS-LMS Algorithm With Single-Ended Integrating DFE Receiver for Multi-Drop DRAM Interface", IEEE Journal of Solid-State Circuits, IEEE Service Center, vol. 49, No. 9, Abstract only, Sep. 1, 2011, 1-2 (2 pages).

Hidaka, Yasuo, et al., "A 4-Channel 1.25-10.3 Gb/s Backplane Transceiver Macro With 35 dB Equalizer and Sign-Based Zero-Forcing Adaptive Control", IEEE Journal of Solid-State Circuits, vol. 44, No. 12, Dec. 2009, 3547-3559 (13 pages).

Holden, Brian, "An exploration of the technical feasibility of the major technology options for 400GE backplanes", IEEE 802.3 400GE Study Group, Geneva, CH, Jul. 16, 2013, 1-18 (18 pages).

Navid, Reza, et al., "A 40 Gb/s Serial Link Transceiver in 28 nm CMOS Technology", IEEE Journal of Solid-State Circuits, vol. 50, No. 4, Apr. 2015, 814-827 (14 pages).

Shibasaki, Takayuki, et al., "A 56-Gb/s Receiver Front-End with a CTLE and 1-Tap DFE in 20-nm CMOS", IEEE 2014 Symposium on VLSI Circuits Digest of Technical Papers, 2014, (2 pages).

Won, Hyosup, et al., "A 28-Gb/s Receiver With Self-contained Adaptive Equalization and Sampling Point Control Using Stochastic Sigma-Tracking Eye-Opening Monitor", IEEE Transactions on Circuits and Systems—I: Regular Papers, vol. 64, No. 3, Mar. 2017, 664-674 (11 pages).

Machine Translation of KR0340178B1, 1-8 (8 pages).

* cited by examiner

METHODS AND SYSTEMS FOR PROVIDING MULTI-STAGE DISTRIBUTED DECISION FEEDBACK EQUALIZATION

CROSS-REFERENCE TO RELATED APPLICATIONS

This application is a continuation of U.S. Non-Provisional application Ser. No. 15/835,648, filed Dec. 8, 2017, entitled "Methods and Systems for Providing Multi-Stage Distributed Decision Feedback Equalization", which is hereby incorporated herein by reference in its entirety for all purposes.

REFERENCES

The following prior applications are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" hereinafter identified as [Cronie I].

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. patent application Ser. No. 15/582,545, filed Apr. 28, 2017, naming Ali Hormati and Richard Simpson, entitled "Clock Data Recovery Utilizing Decision Feedback Equalization", hereinafter identified as [Hormati I].

U.S. patent application Ser. No. 15/792,599, filed Oct. 24, 2017, naming Armin Tajalli, entitled "Multiphase Data Receiver with Distributed DFE", hereinafter identified as [Tajalli I].

BACKGROUND

Data communications between electronic devices such as integrated circuits in a system are in general constrained by the behavior of the interconnecting transport medium, such as wires, printed circuit traces, or optical fibers. Transmission line effects including attenuation, signal reflections, and frequency-dependent propagation characteristics distort transmitted signals, requiring corrective solutions to be applied.

Linear circuit corrective measures include amplification of received signals, and frequency-domain signal correction using as one example Continuous-Time Linear Equalization (CTLE).

Data-dependent equalization is also well known in the art. Generally, these time-domain-oriented equalization methods focus on compensating for the effects of inter-symbol-interference or ISI on the received signal. Such ISI is caused by the residual electrical effects of a previously transmitted signal persisting on the communications transmission medium, so as to affect the amplitude or timing of the current symbol interval. As one example, a transmission line medium having one or more impedance anomalies may introduce signal reflections. Thus, a transmitted signal will propagate over the medium and be partially reflected by one or more such anomalies, with such reflections appearing at the receiver at a later time in superposition with signals propagating directly.

Digital corrective measures can be applied at the transmitter, as one example using pre-equalization with Finite Impulse Response (FIR) filtering, and at the receiver using methods including Feed-Forward Equalization (FFE) and Decision Feedback Equalization (DFE).

Decision Feedback Equalization is performed by maintaining a history of previously-received data values at the receiver, which are processed by a transmission line model to predict the expected influence each of the historical data values would have on the present receive signal. Such a transmission line model may be pre-calculated, derived by measurement, or generated heuristically, and may encompass the effects of one or more than one previous data interval. The predicted compensation for the influence of these one or more previous data intervals is collectively called the DFE correction, which may be explicitly combined with the received data signal prior to receive sampling of the resulting corrected signal, or implicitly combined by using the DFE correction to modify the reference level to which the received data signal is compared in the receive data sampler or comparator.

BRIEF DESCRIPTION

Application of Decision Feedback Equalization methods to high-speed data receivers can be complicated by the need to combine many DFE correction terms, each corresponding to the influence of a particular previous receive unit interval. Further complications are introduced by the common practice of utilizing multiple essentially parallel processing phases to pipeline or extend the available detection time for a given received data bit. These complications may include difficulty in achieving timely computation and distribution of DFE corrections to the various parallel processing phases, and undesirable side effects when those corrections are applied, such as reduction of detector amplification or gain.

Methods and systems are thus described for pre-charging two or more sets of nodes to set a differential output of a latch connected to the two or more sets of nodes in a pre-charged state, the two or more sets of nodes comprising (i) a set of data signal nodes and (ii) a set of DFE correction nodes, in response to a sampling clock, generating a differential data voltage signal by discharging the set of data signal nodes according to a received differential input voltage signal and generating an aggregate differential DFE correction signal by discharging the set of DFE correction nodes according to a summation of a plurality of DFE correction factors, and generating a data decision by driving the differential output of the latch into one of two possible output states according to a summation of the differential data voltage signal and the aggregate differential DFE correction signal and subsequently holding the data decision by holding the differential output of the latch in a latched state for a duration determined by the sampling clock.

Methods and apparatus are described allowing efficient computation and distribution of DFE correction information within a high speed data receiver system, and application of said DFE corrections without significant impact on detector gain.

DETAILED DESCRIPTION

In recent years, the signaling rate of high speed communications systems have reached gigabit per second speeds, with individual transmission unit intervals measured in picoseconds. To meet such stringent timing requirements, it is necessary to minimize circuit delays by minimizing node capacitances and eliminating unnecessary processing elements. Even secondary circuit characteristics such as the settling time of an analog comparator can represent a significant proportion of the available time budget.

As one example, a conventional data communications receiver's Decision Feedback Equalization system stores historic values for one or more detected data values from previous receive unit intervals, and computes a DFE compensation value from these historic values that is subsequently applied to the received signal to facilitate the current unit interval's detection. For purposes of explanation, this computation may be simply described as comprising multiplication of each previous unit interval's data value by a predetermined scaling factor, and then summing each of these scaled results (each representing the latent effects of successive previous unit intervals on the presently received signal) to produce a composite DFE compensation value representing the cumulative predicted effect of all such previous unit intervals. In a typical receiver design, this DFE compensation value will be combined with the current receive signal input, to produce a corrected signal more accurately representing the received data value which may then be sampled in both time and amplitude to obtain a detected receive data value.

Those familiar with the art will recognize that the DFE compensation value produced as described above cannot be fully determined until the previous unit interval's data value has been detected. Thus, as data rates increase, a point will be reached at which the information needed to produce the first term of the DFE compensation value (i.e. the received data value for the previous unit interval) is not available in time to be applied to the next unit interval's detection. Indeed, at the highest data rates currently used in practice, this situation may exist for multiple previous unit intervals, as the detection time required for a single data value may represent multiple unit interval durations. Thus, it is common for embodiments to forgo this "closed loop" DFE method for one or more of the most recent unit intervals, instead relying on an "unrolled loop" or "speculative" generation of one or more elements of the DFE compensation value for these most recent unit intervals.

Figure 1:
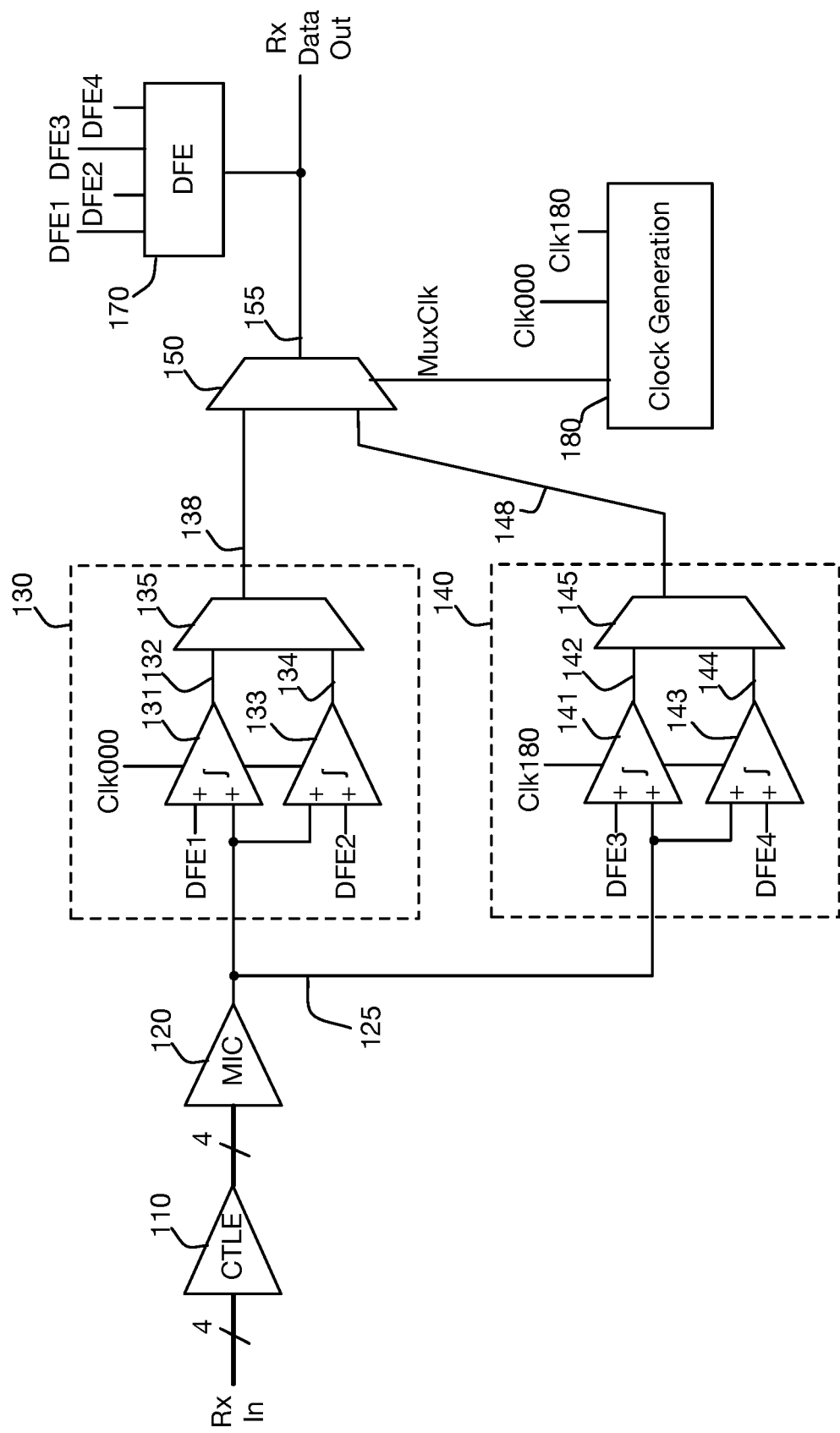
FIG. 1 is an embodiment of one channel of a data receiver utilizing Decision Feedback Equalization and multiple parallel processing stages.

FIG. 1 illustrates one embodiment of a data receiver incorporating speculative DFE for one previous receive unit interval. This example includes a receiver front end (110 and 120) along with a full data path for one received data bit (130, 140, 150, 160); a full receiver embodiment would typically share the single frontend with data paths for additional data bits. DFE computation 170 and Clock Data Recovery 180 subsystems may in some embodiments be shared across multiple data paths, or dedicated to a particular data path.

In the illustrated example offered without implying limitation, four received wire signals are obtained from the communications channel, possibly representing two differential signal pairs or alternatively, one four-wire stream communicating three data bits encoded using an Orthogonal Differential Vector Signaling code (ODVS), as described in [Cronie I]. Continuous Time Linear Equalizers 110 provide frequency-dependent amplification of the received wire signals, and Multi-Input Comparators (MIC) 120 optionally combine the amplified wire signals to reverse ODVS encoding and obtain detected data signals, as in [Holden I]. In differential receiving embodiments, each such MIC will have two active inputs and will functionally act as a differential line receiver, and in single-ended receiver embodiments, receive operations are performed directly on individual wire signals, bypassing the need for any MIC functionality.

One such embodiment operates with a communication unit interval of approximately 35 picoseconds, corresponding to a data rate of approximately 28 Gigabaud. To support such data rates, the example receiver incorporates two parallel processing stages 130 and 140 in each received signal data path, each of which detects the data received from one differential wire pair or ODVS subchannel during alternating unit intervals. At the described data rate, this interleaving of parallel processors allows each processing stage two unit intervals or 70 picoseconds to capture and detect each received data bit.

The transmission line characteristics associated with this communications system indicate that Decision Feedback Equalization (DFE) over as many as ten receive unit intervals may be required. Because of the high data rate, timely propagation of the first DFE correction term associated with the immediately preceding received data value is extremely difficult to achieve in practice. Thus, the example of FIG. 1 uses one stage of speculative or "loop unrolled" DFE, in which separate detectors capture results as if the preceding data value were a '1' or were a '0', with the correct result later chosen for use once the previous data value has been determined.

The operation of each parallel processing stage is identical. For 130, integrate-and-sample stages 131 and 133 simultaneously capture the received signal amplitude plus DFE corrections at the rising edge of sampling clock Clk000. In this example utilizing a single element of speculative DFE, the DFE corrections applied to 131 and 133 differ only in their most immediate term, corresponding to speculative corrections assuming the immediately preceding data bit was a '1', or a '0' respectively. Digital multiplexer 135 obtains the value of the preceding data bit when it is detected by the other processing phase 140, and directs the appropriate speculatively detected result 132 or 134 to data output 138 for phase 130.

The operation of parallel processing phase 140 is identical, except that sampling occurs on the rising edge of sampling clock Clk180 (one receive unit interval later than that of Clk000) and the value of the previous data bit detected by processing phase 130 will subsequently be used by multiplexer 145 to select one of 142 or 144 as data output 148. High speed multiplexer 150 combines the alternate-unit-interval received values 138 and 148 into a full rate received data stream 155. In other embodiments, the received values may be maintained as parallel, lower speed data streams.

DFE compensation subsystem 170 maintains a history of the received data values to compute aggregate DFE correction values DFE1, DFE2, DFE3, DFE4 for the two processing phases. Other embodiments may separately compute DFE correction values for each processing phase, or indeed for each sampler individually, without limitation. Each term $H_N$ of the DFE correction it computes is derived from a historic data value X_N received in the N'th preceding receive unit interval, multiplied by a scaling factor $K_N$ derived from the signal propagation model for the transmission medium. For computational simplicity, individual terms in the aggregate differential DFE correction signal are considered to be zero-based differential corrections from the normal detection threshold of the sampler. Computationally, this implies that a data '1' corresponds to a +1 multiplier of a given scale factor, and a data '0' corresponds to a −1 multiplier for the same scale factor.

In at least one embodiment, the resulting DFE corrections are represented as analog differential signals, configured such that exchanging the two signals of the differential pair converts a correction term corresponding to a data '1' to that corresponding to a data '0'. The DFE correction values may also include or subsequently be combined with configured, adjustable, or fixed offset or bias levels, which in some embodiments may be individual to specific samplers, allowing compensation to be made for component variations. Thus, in one such embodiment, the total of all DFE corrections and configured offset levels at, for example, sampler 131 may be different than those at sampler 141, as correction for signal amplitude and component variations between those two circuit elements.

In a first example, time T=0 represents the unit interval currently being received by processing phase 140 which will eventually result in detection of data value X(T=0), which for descriptive convenience with hereinafter be referred to simply as X_0. Similarly, T=−1 represent the preceding unit interval relative to that reception time, which was processed by 130 to produce data value X(T=−1), which will hereinafter be referred to simply as X_1. (This time-series nomenclature describing the sequential processing within one data path instance should not be confused with the common practice of describing concurrently received data bits across multiple data path instances as "D0, D1, D2 . . . " as the examples herein address the time series of operations within a single received data path, i.e. sequential values of data bit D0 in that common nomenclature.)

$H_1$ through $H_{10}$ represent distinct components of the overall DFE correction. In the following examples the received data is binary, thus each component is determined by multiplication of a coefficient or correction factor K by +1 (for a data '1') or −1 (for a data '0'.) In a practical embodiment these coefficients are dependent on network propagation and detection characteristics and may differ for different wires, differential pairs, ODVS subchannels, and/or physical sampler instances.

$$DFE1=(K_1\times 1)+(K_2\times X\_2)+\ldots+(K_{10}\times X\_10)+C1 \quad \text{Eqn. 1}$$

$$DFE2=(K_1\times -1)+(K_2\times X\_2)+\ldots+(K_{10}\times X\_10)+C2 \quad \text{Eqn. 2}$$

$$DFE3=(K_1\times 1)+(K_2\times X\_2)+\ldots+(K_{10}\times X\_10)+C3 \quad \text{Eqn. 3}$$

$$DFE4=(K_1\times 1)+(K_2\times X\_2)+\ldots+(K_{10}\times X\_10)+C4 \quad \text{Eqn. 4}$$

The combined corrections e.g. DFE3 and DFE4 applied to 141 and 143 in processing phase 140 respectively differ only in the sign of the first DFE correction term ($H_1$) corresponding to the immediately preceding unit interval, as well as any adjustment or calibration variation incorporated in bias constants C1 and C2. As part of the speculative DFE processing of this first term, the first correction term in Eqns. 3 and 4 includes the anticipated data '1' and data '0' values, with the appropriate result produced by either 141 or 143 subsequently selected based on the actual detected value for X_1 obtained in the preceding unit interval from processing phase 130. Eqns. 1 and 2 show similar computations for the corrections used by 130.

Figure 2:
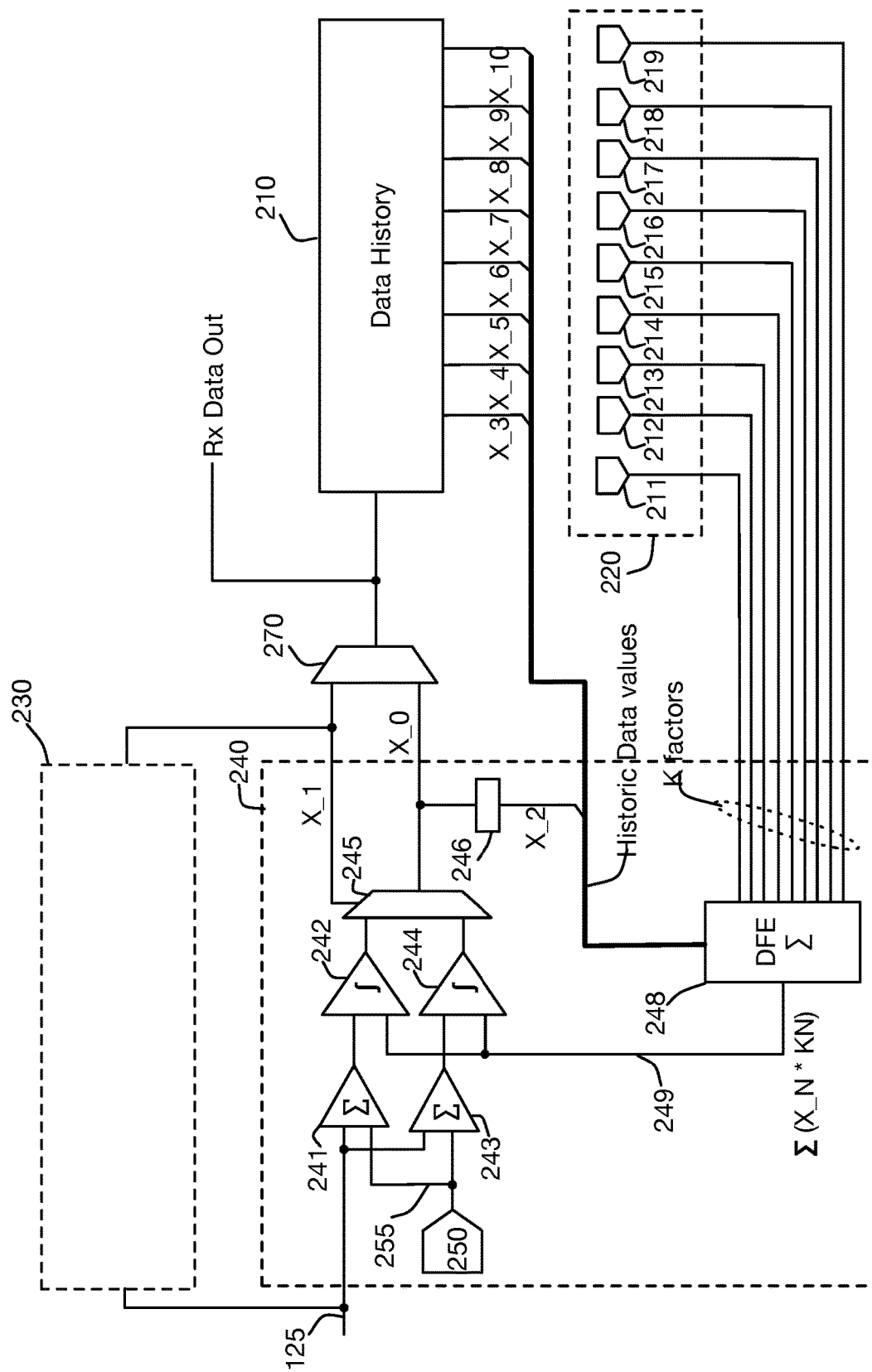
FIG. 2 shows additional details of an embodiment combining multiple DFE corrections and multiple parallel processing stages.

FIG. 2 provides a more detailed illustration of one embodiment of a multi-phase receiver using speculative DFE. As in the previous example, identical processing phases 230 and 240 detect one received data bit, sampling on alternating received unit intervals.

For a number of common amplifier topologies, it is understood in the art that incorporating additional signal inputs will result in reduced signal gain, typically by a factor of $$\frac{1}{N+1}$$

for an N-input amplifier. Thus, directly combining nine or more DFE correction terms with a received signal input in a single amplifier would significantly limit the amount of gain that could be applied to the received signal. To minimize this degradation of signal gain, the necessary summations are partitioned among three distinct circuits.

Each non-speculative DFE correction term is computed 248 as previously described, and a summed result is output 249 as in Eqn. 5.

$$H_{sum}=(K_2\times D_2)+\ldots+(K_9\times D_{10}) \quad \text{Eqn. 5}$$

Figure 4:
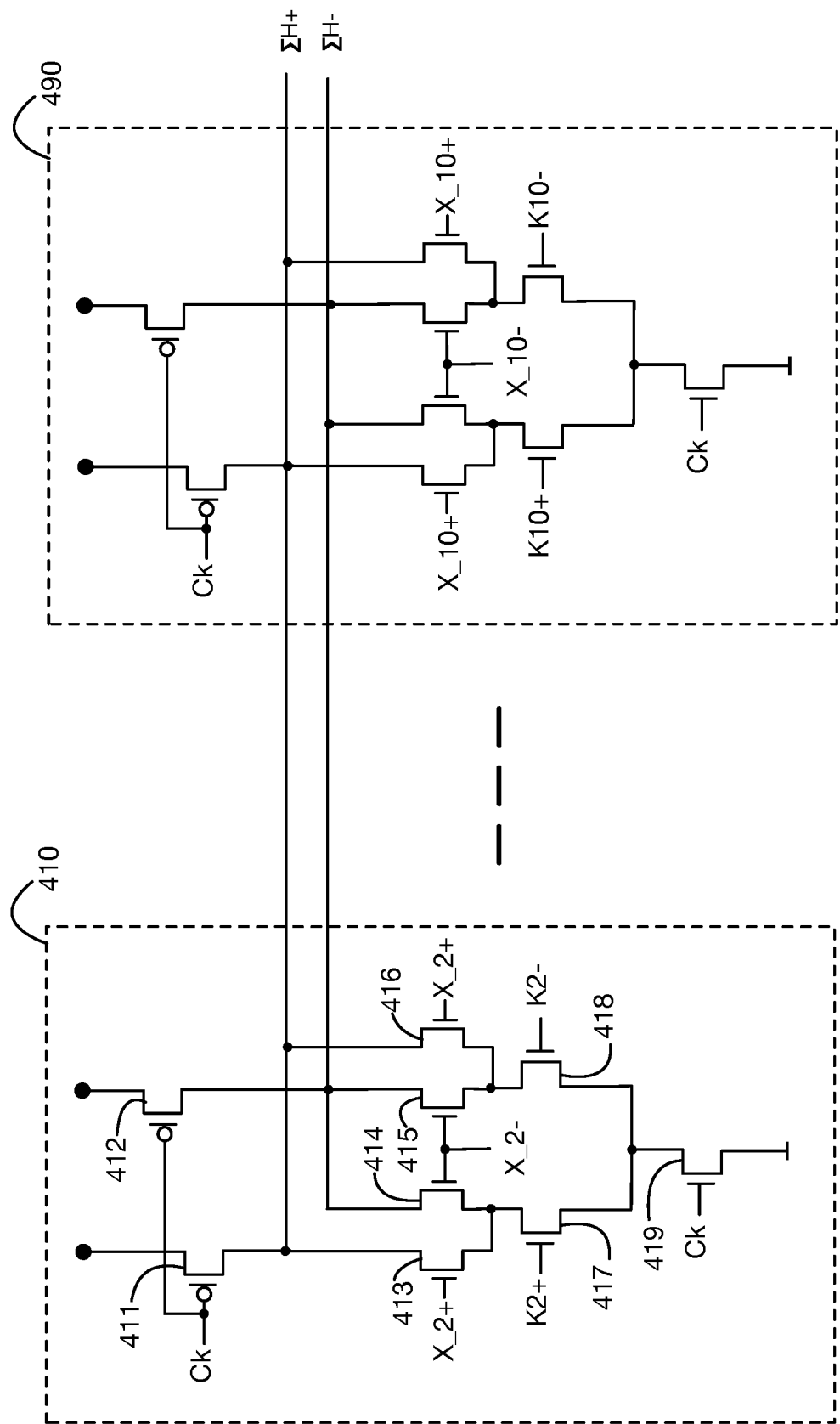
FIG. 4 is a schematic diagram for a circuit to compute multiple DFE correction terms and output a summed correction result.

FIG. 4 is a schematic diagram of one embodiment a circuit performing this computation and first summation, comprised of nine subsystems 410 . . . 490, each handling computation of one correction term. The first subsystem 410 and last subsystem 490 are shown explicitly, the remainder implicitly in FIG. 4.

Within 410, transistors 411 and 412 precharge differential output nodes ΣH+ and ΣH− when clock Ck is low. When Ck goes high, transistor 419 permits charge to drain through differential transistor pair 417/418, with current divided between the two legs as determined by the DFE factor K2 which is input as a differential current, e.g. from a configuration DAC. Transistors 413, 414, 415, 416 act as switches, connecting differential pair 417/418 to the output nodes in a first or direct configuration when X_2 is '1', and in a second or reverse configuration when X_2 is '0'. Thus, the resulting differential signal on the output nodes corresponds to either +1 or −1 times the configured correction factor K2, as required by Eqn. 5.

The eight identical stages 420 . . . 490 each perform similar computations to those described for 410, using factors K3-K10 and historical data values X_3 . . . X_10. As all stages are in parallel across output nodes ΣH+ and ΣH−, those differential outputs represent the summation of all nine computed terms.

In FIG. 2, the DFE correction or K factors required for the computation of Eqn. 5 are produced by nine Digital to Analog (DAC) converters 211-219, collectively identified as 220. In one embodiment, each DAC in 220 is configured to output a differential analog voltage corresponding to a particular correction factor $K_N$ for use by summed DFE computation circuit 248.

Figure 3:
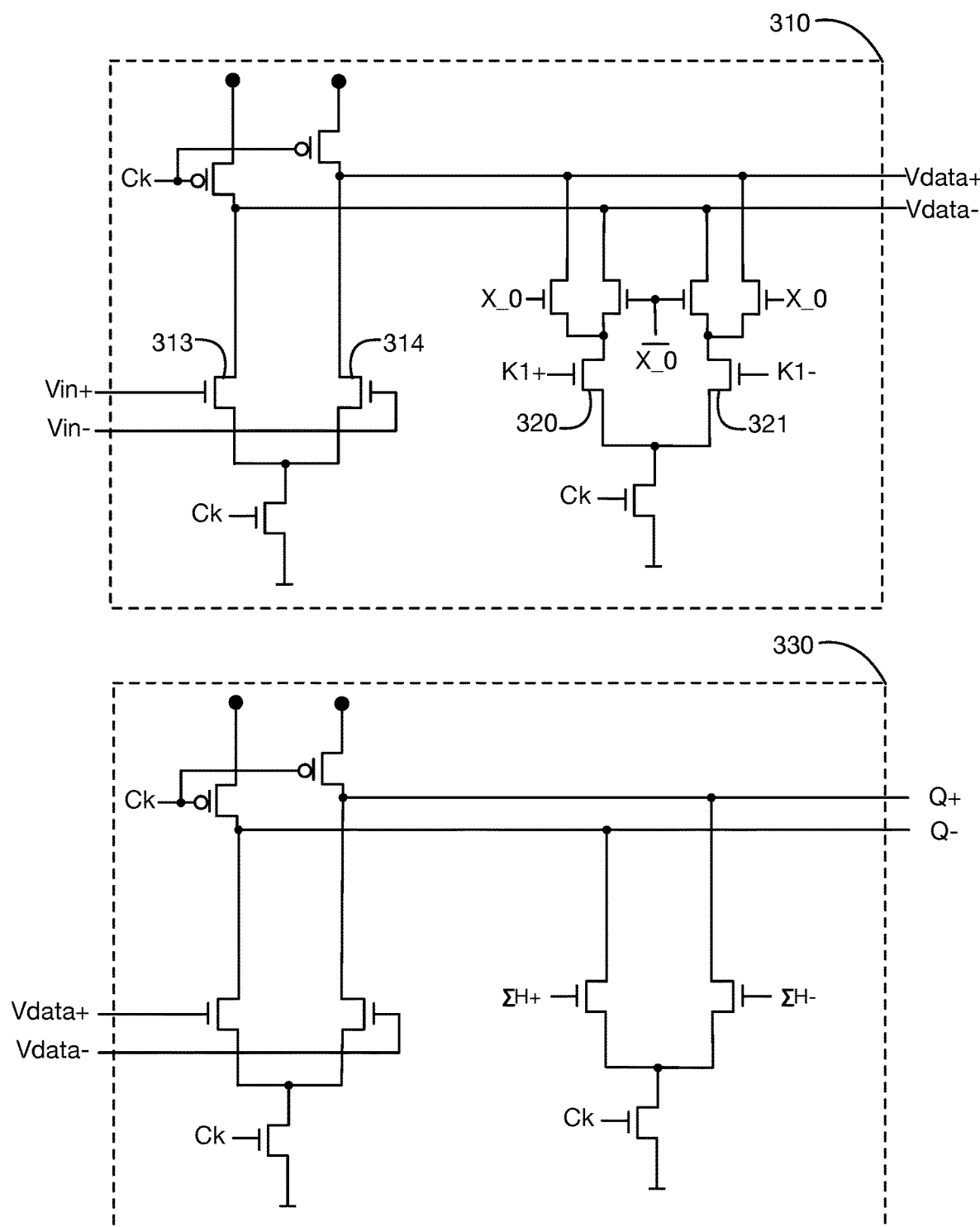
FIG. 3 provides schematic diagrams of multiple input summation circuits.

The resulting summed DFE correction 249 is presented as an input to a second summation circuit, shown as samplers 242 and 244. Circuit 330 of FIG. 3 illustrates one suitable sampler embodiment, in which differential inputs Vdata and ΣH are summed on the rising edge of sampling clock Ck.

The results captured by samplers 242 and 244 represent speculative results assuming that the previous unit interval data value was a '1' (for 242) or a '0' (for 244.) Thus, the signals input to those samplers must be offset by appropriately different values of the first DFE correction term $H_1$.

Figure 10:
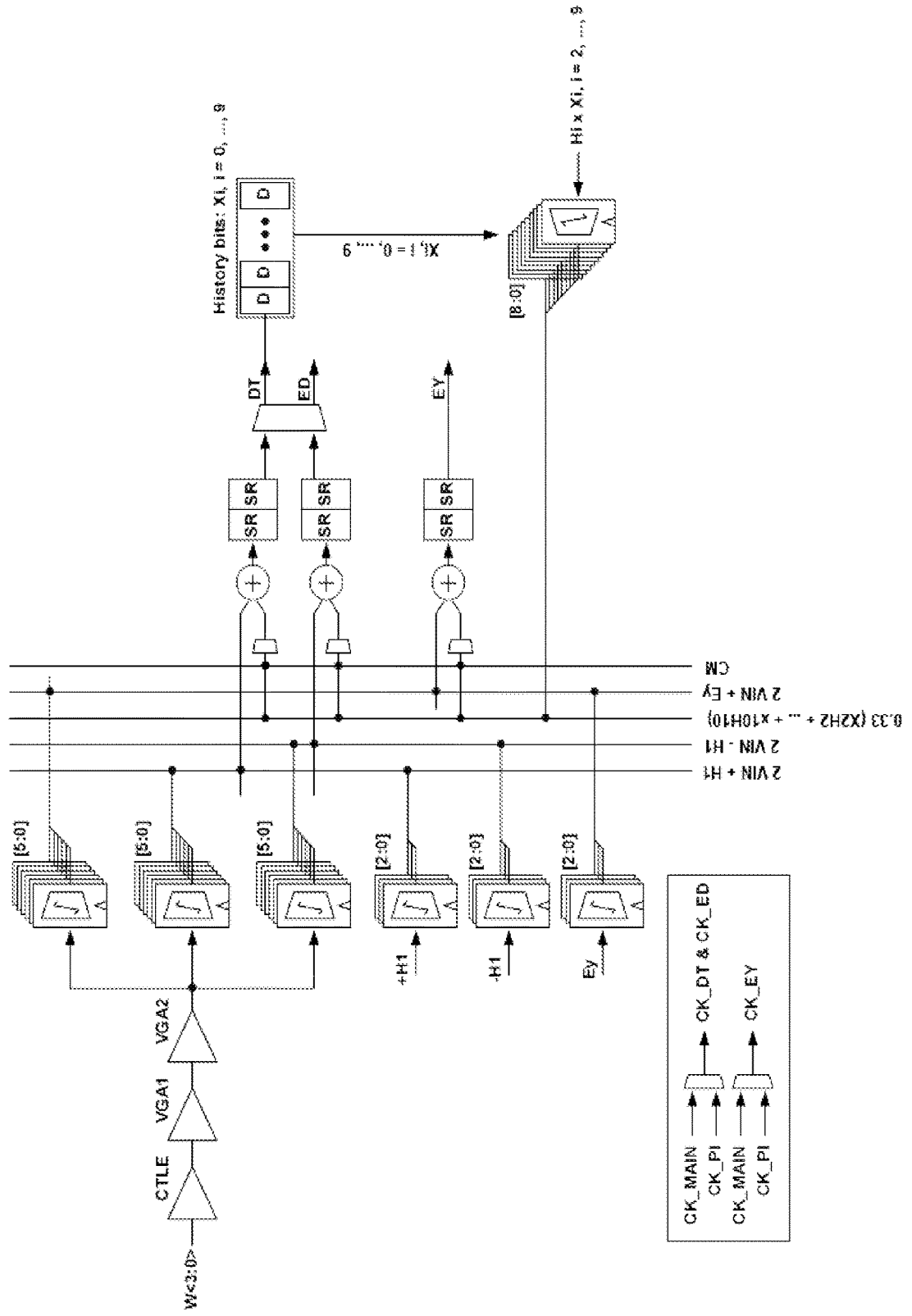
FIG. 10 shows one system embodiment incorporating elements described herein.

To produce these values, received input signal 125 is processed by a third summation circuit, shown in FIG. 2 as amplifiers 241 and 243, each of which are configured to add a speculative DFE correction factor $K_1$, differing only in the sign of the resulting correction. DAC 250 is configured to provide the correction factor 255. Circuit 310 of FIG. 3 is a schematic diagram of one suitable embodiment suitable for use at 241 and 243 of FIG. 2. The two circuit instances differ only in how control signal X_0 is configured; in 241 X_0 is hard-wired to a logic '1', and in 243 X_0 is hard-wired to a logic '0'. The signal gain for the different input elements of 310 may be modified by adjusting the current contribution over the various signal paths (e.g. via differential pair 313/314 versus differential pair 320/321) to the summed result. In one embodiment, the relative transistor dimensions are scaled to provide such adjustment; in another embodiment, multiple instances of identical transistor elements are paralleled to provide such adjustment. Such an embodiment incorporating multiple instances of identical transistor elements is shown in FIG. 10, in which the input signal Vin has a gain of 6 applied by providing Vin to six identical current-mode output samplers connected in parallel, while the speculative DFE components +H1 and −H1 are provided to three identical current-mode output samplers connected in parallel, and the known DFE factors X2H2 . . . X10H10 are each connected to one respective identical current-mode output sampler. Each identical current-mode output sampler provides an equal amount of current, and having multiple such samplers connected in parallel thus provides a current mode summation at a common output node.

As previously described, the speculative detection is resolved by selection of the valid sampled result by multiplexer 245, controlled by the data value obtained in the previous unit interval, X_1. In some embodiments, a multiplexer 270 may be included to produce a full rate serial stream into Data History 210, while alternative embodiments may operate on data streams from different processing phases without mux'ing them down to a single stream.

In one embodiment data value X_1 detected by processing phase 230 in the previous unit interval is directly taken from processing phase 230 to minimize circuit propagation delay, rather than being taken from Data History 210. Similarly, the data value X_2 detected by processing phase 240 in its previous processing cycle may be made available within the same processing phase for timely generation of the $H_2$ DFE correction term. As an optional pipelining optimization, latch 246 is shown as capturing the output data value and holding it for use in computing $H_2$ by 248, increasing the timing margin for generation of summed DFE correction 249. Some embodiments utilize a similar pipelining latch to increase the timing margin for the X_1 data value controlling multiplexer 245 selection.

For the purposes of description below, the signals VA+/VA− may correspond to a differential data voltage signal generated at least based on the received differential input voltage signal Vin (illustrated as Vdata+/Vdata− in FIG. 3), while VB+/VB− correspond to the aggregate differential DFE correction signal formed based on the summation of DFE correction factors H2 . . . H10 (illustrated as ΣH+ and ΣH− in FIGS. 3 and 4). Some embodiments may not use speculative DFE terms +H1 and −H1, while alternative embodiments may utilize speculative DFE in the various configurations described below.

Figure 6:
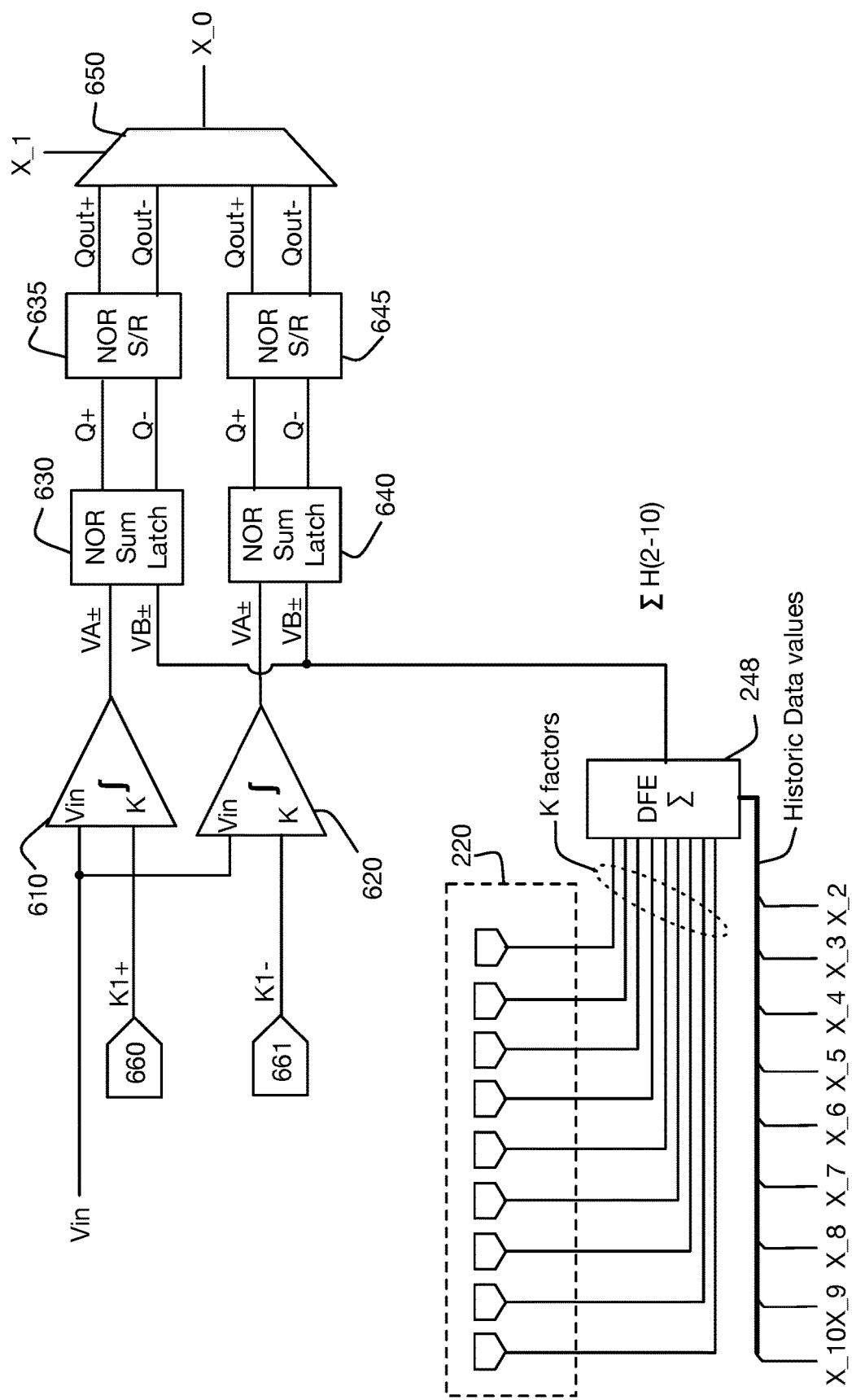
FIG. 6 shows another embodiment utilizing the circuits of FIGS. 3, 4, and 5.

In some embodiments, as shown in FIG. 6, an apparatus includes a discrete time-integration stage. In FIG. 6, the discrete time-integration stage includes integrators 610, 620, and DFE summation circuit 248 that may take the form of an integrator. The discrete time-integration stage includes two or more sets of nodes, the two or more sets of nodes including at least a set of data signal nodes for holding voltages VA+/− and a set of DFE correction nodes for holding voltages VB+/−. The discrete time-integration stage is configured to pre-charge the two or more sets of nodes to set a differential output of a multi-input summation latch 630 connected to the two or more sets of nodes in a pre-charged state, and generate, in response to a sampling clock, a differential data voltage signal VA+/− by discharging the set of data signal nodes according to a received differential input voltage signal and an aggregate differential DFE correction signal VB+/− by discharging the set of DFE correction nodes according to a summation of a plurality of DFE correction factors. In FIG. 6, the multi-input summation latch 630 may generate a data decision by driving the differential output of the multi-input summation latch into one of two possible output states according to a summation of the differential data voltage signal and the aggregate differential DFE correction signal, the multi-input summation latch configured to subsequently hold the data decision by holding the differential output of the multi-input summation latch in a latched state for a duration determined by the sampling clock.

Figure 9:
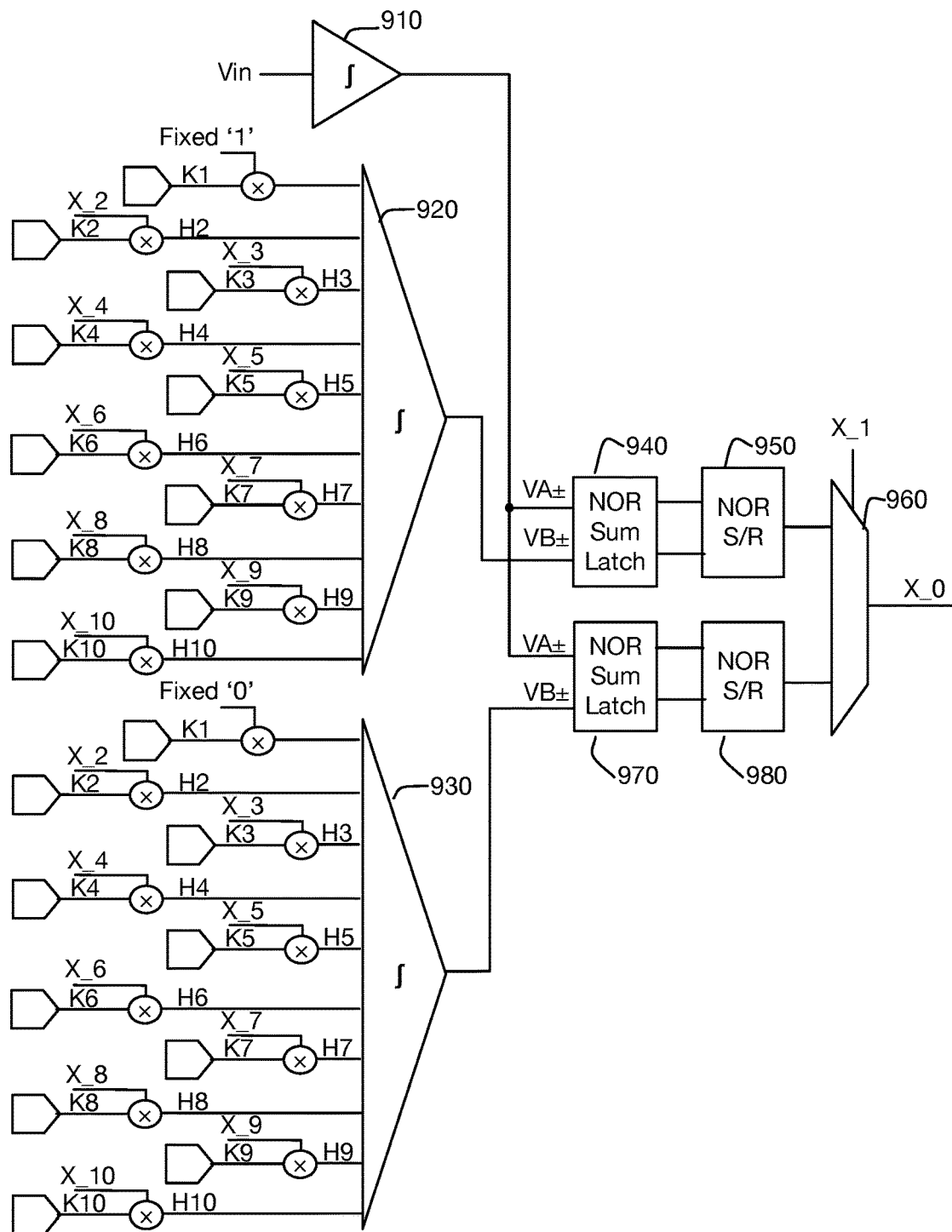

In some embodiments, as shown in FIG. 6, the discrete time integration stage is further configured to generate a pair of differential speculative DFE terms, K1+ and K1−. In such embodiments, the discrete integration stage may generate a pair of speculative data decisions by separately applying each differential speculative DFE term of the pair of differential speculative DFE terms to the summation of the differential data voltage signal and the aggregate differential DFE correction signal. In FIG. 6, the speculative terms are applied to the received differential input voltage signal, and two multi-input summation latches 630 and 640 receive the speculative data decisions. In such embodiments, the apparatus further includes a multiplexor 650 for selecting one of the pair of speculative data decisions as the data decision in response to completion of a previous data decision. In alternative embodiments, the speculative DFE terms may be applied to the aggregate DFE correction signal, as shown in FIG. 9.

In some embodiments, a second latch 635 (as well as 645 in the speculative DFE embodiments) is configured to receive the data decision and to provide the data decision as a data decision output for an entire signaling interval.

In some embodiments, one or more CMOS inverters buffer the differential data voltage signal and the aggregate differential DFE correction signal.

In some embodiments, the discrete time integration stage comprises a first amplification stage comprising the set of data signal nodes and a second amplification stage comprising the set of DFE correction nodes. In FIG. 6, the first amplification stage may include the integrators 610 and 620, while the second amplification stage includes DFE summation circuit 248. In such embodiments, the first amplification stage may include a plurality of differential transistor pairs connected in parallel configured to receive the received differential input voltage signal and to responsively generate a plurality of currents in parallel via the plurality of differential transistor pairs connected in parallel, wherein the applied gain representing a discharge rate of the set of data signal nodes. FIG. 10 illustrates such a configuration, where each element connected to VGA2 is a circuit similar to element 310 in FIG. 3, without the speculative DFE term applied (the speculative DFE terms are shown as +/−H1 in FIG. 10).

Figure 5:
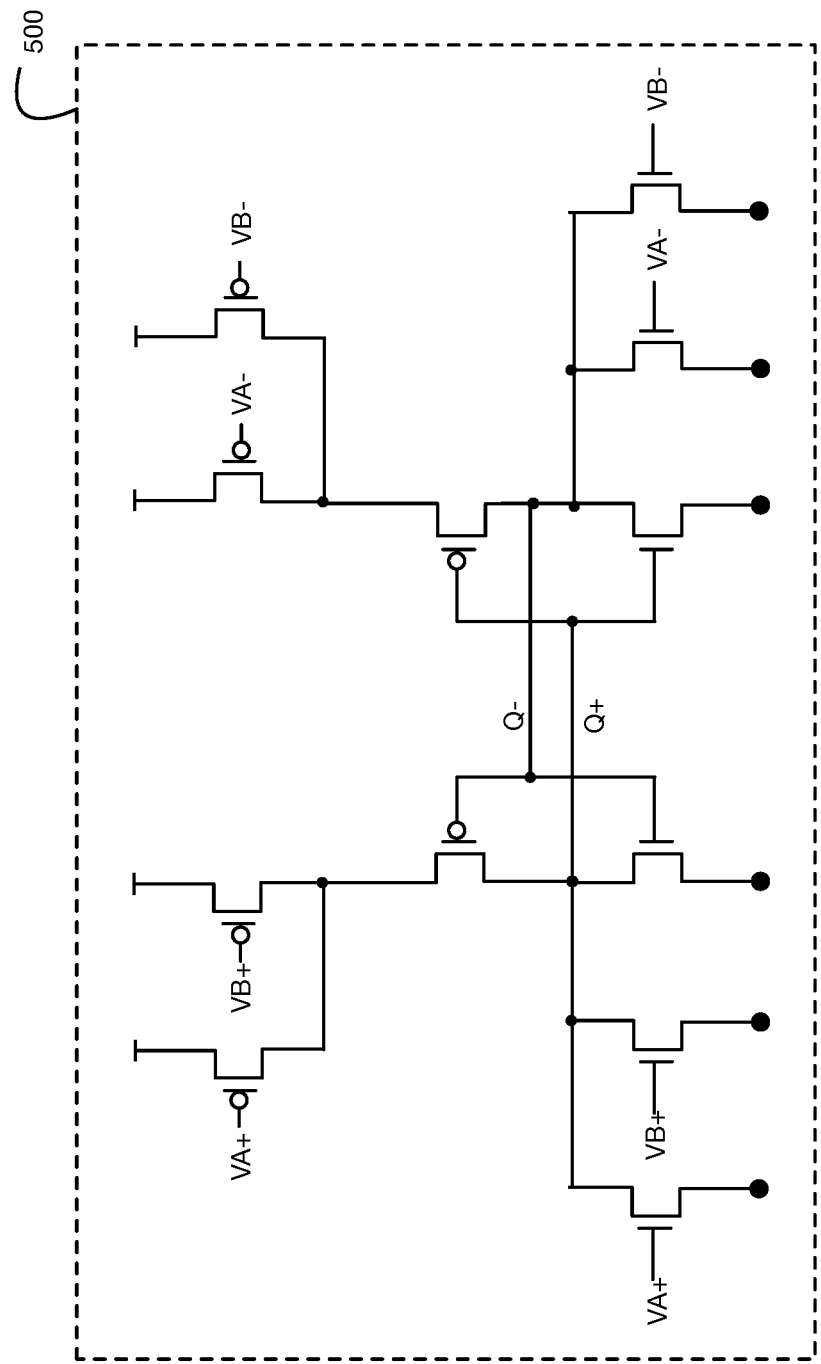
FIG. 5 is a schematic diagram of a NOR-based multi-input summation latch, in accordance with some embodiments.
Figure 11:
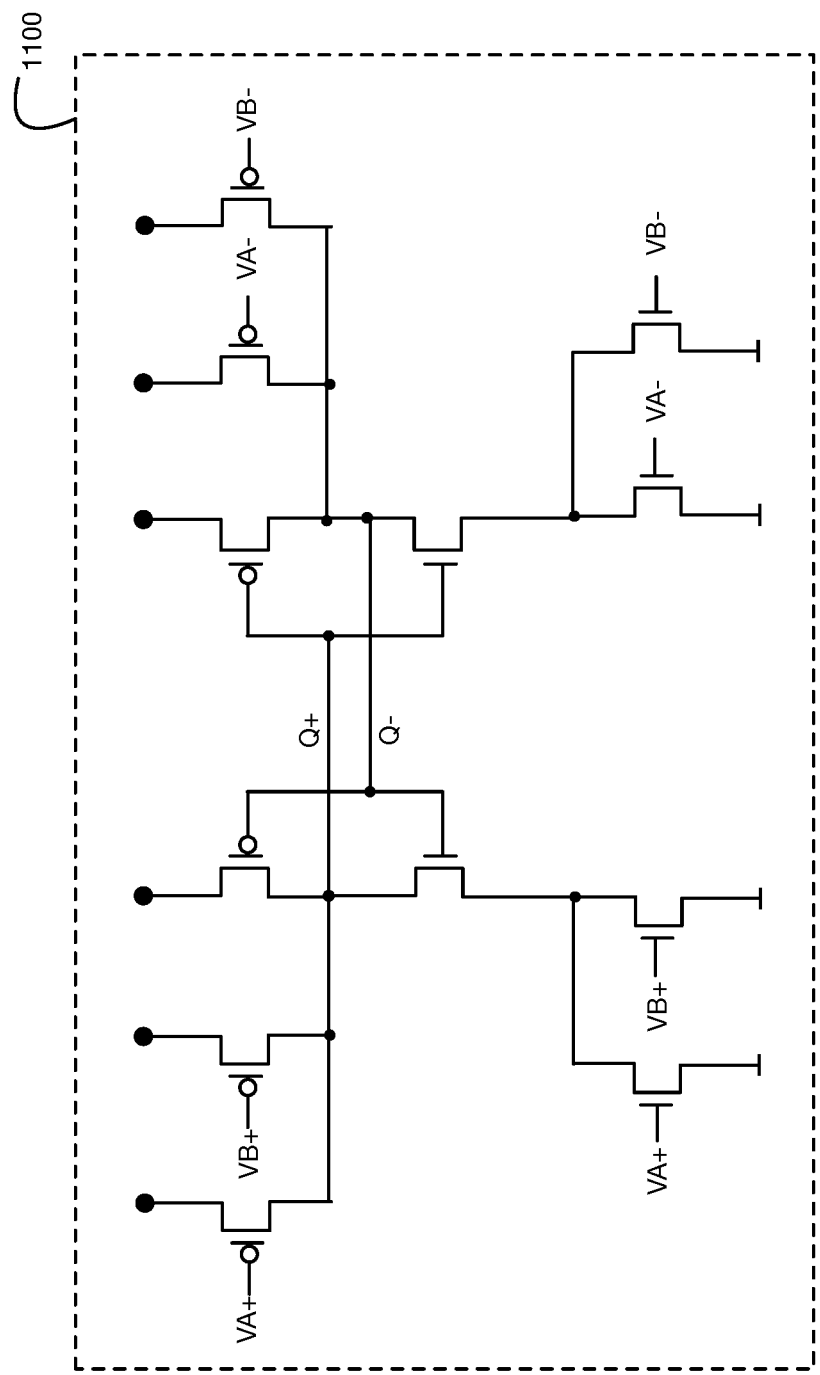
FIG. 11 illustrates a schematic diagram of an NAND-based multi-input summation latch, in accordance with some embodiments.
Figure 13A:
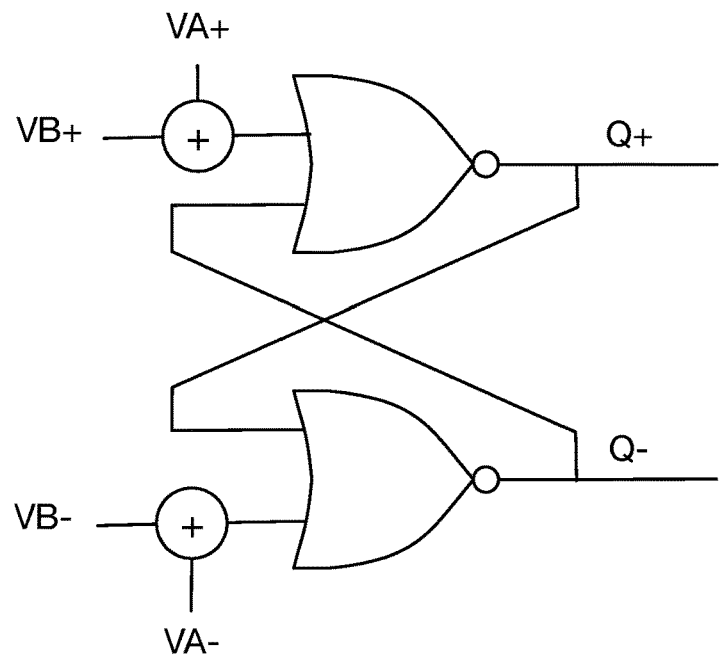
FIGS. 13A and 13B are block diagrams of NOR-based and NAND-based multi-input summation latches, in accordance with some embodiments.
Figure 13B:
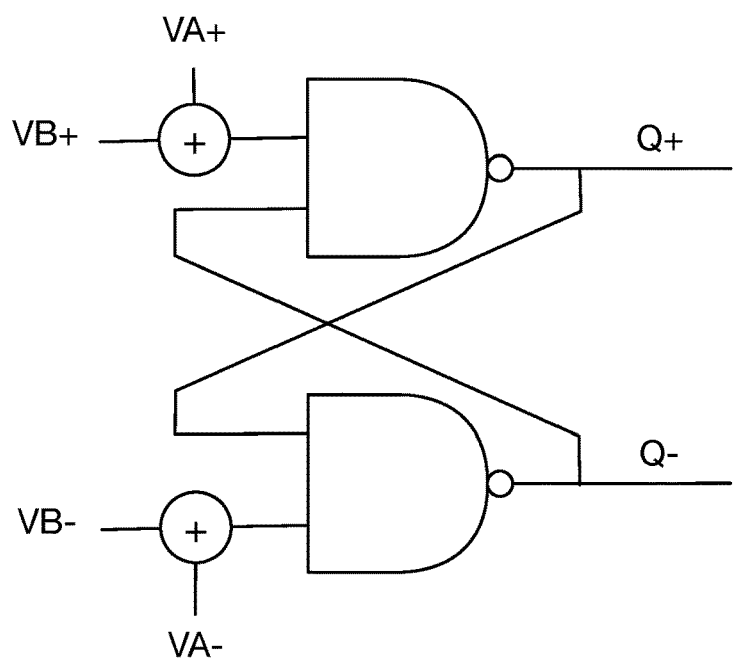

FIG. 6 shows an alternative embodiment that is functionally equivalent to processing phase 240 of FIG. 2, incorporating multi-input summation latches 630 and 640. In some embodiments, the multi-input summation latches may take the form similar to that of a NOR-based SR latch or a NAND-based SR latch as shown in the schematic diagrams of FIGS. 13A and 13B, respectively. Transistor schematics for the NOR-based multi-input summation latches and NAND-based multi-input summation latches are shown in FIGS. 5 and 11, respectively. As shown in FIG. 5 the NOR-based multi-input summation latch 500 forms an input summation between the differential data voltage signal VA+/VA− and the aggregate differential DFE correction signal VB+/VB−, and simultaneously serves as an amplitude slicer and output latch for differential result Q+, Q−. As shown in FIG. 5, the summation is formed by connecting positive-polarity inputs VA+ and VB+ in parallel on one side of the multi-input summation latch, while negative-polarity inputs VA− and VB− are connected in parallel on the other side of the multi-input summation latch. Truth tables for NOR and NAND-based multi-input summation latches are given below in Tables I and II, respectively:

TABLE I

NOR-Based Multi-Input Summation Latch

| $VA_+ + VB_+$ | $VA_- + VB_-$ | Q+ | Q− |
|---|---|---|---|
| 1 | 1 | 0 (precharged state) | 0 (precharged state) |
| 1 | 0 | 0 | 1 |
| 0 | 1 | 1 | 0 |
| 0 | 0 | LATCH | LATCH |

TABLE II

NAND-Based Multi-Input Summation Latch

| $VA_+ + VB_+$ | $VA_- + VB_-$ | Q+ | Q− |
|---|---|---|---|
| 1 | 1 | LATCH | LATCH |
| 1 | 0 | 0 | 1 |
| 0 | 1 | 1 | 0 |
| 0 | 0 | 1 (precharged state) | 1 (precharged state) |

In the NOR-based multi-input summation latch of FIG. 5, the values of $(VA_++VB_+)$ and $(VA_-+VB_-)$ are initially '1', as the sets of nodes holding VA+/− and VB+/− are pre-charged, and thus the differential output Q+/Q− is held at a '00' state. The pre-charged states and latched states in the NOR and NAND-based multi-input summation latches are reversed, while the outputs for data decision states '01' and '10' are the same. In the above tables, there are four possible states, however it should be noted that the input combinations for decision states '10' and '01' identify which summation decreased at a faster rate. This is because the integrators 610, 620, and integrators in 248 are effectively producing an amplitude-to-time conversion, where the amplitude of the signals input to the discrete time integrators is converted into a discharge rate. In such cases, the discharge rate is proportional to the amplitude of the input signals, so a higher amplitude input signal will cause a faster discharge of the corresponding output node, as shown in FIG. 3 and by the timing diagram of FIG. 12. The multi-input summation latch then combines the differential data voltage signal and the aggregate differential DFE correction signal (which are time-converted signals) and subsequently latches to a data decision determined by a change in discharge rates of the $VA_++VB_+$ and $VA_-+VB_-$ polarity summations.

Figure 12:
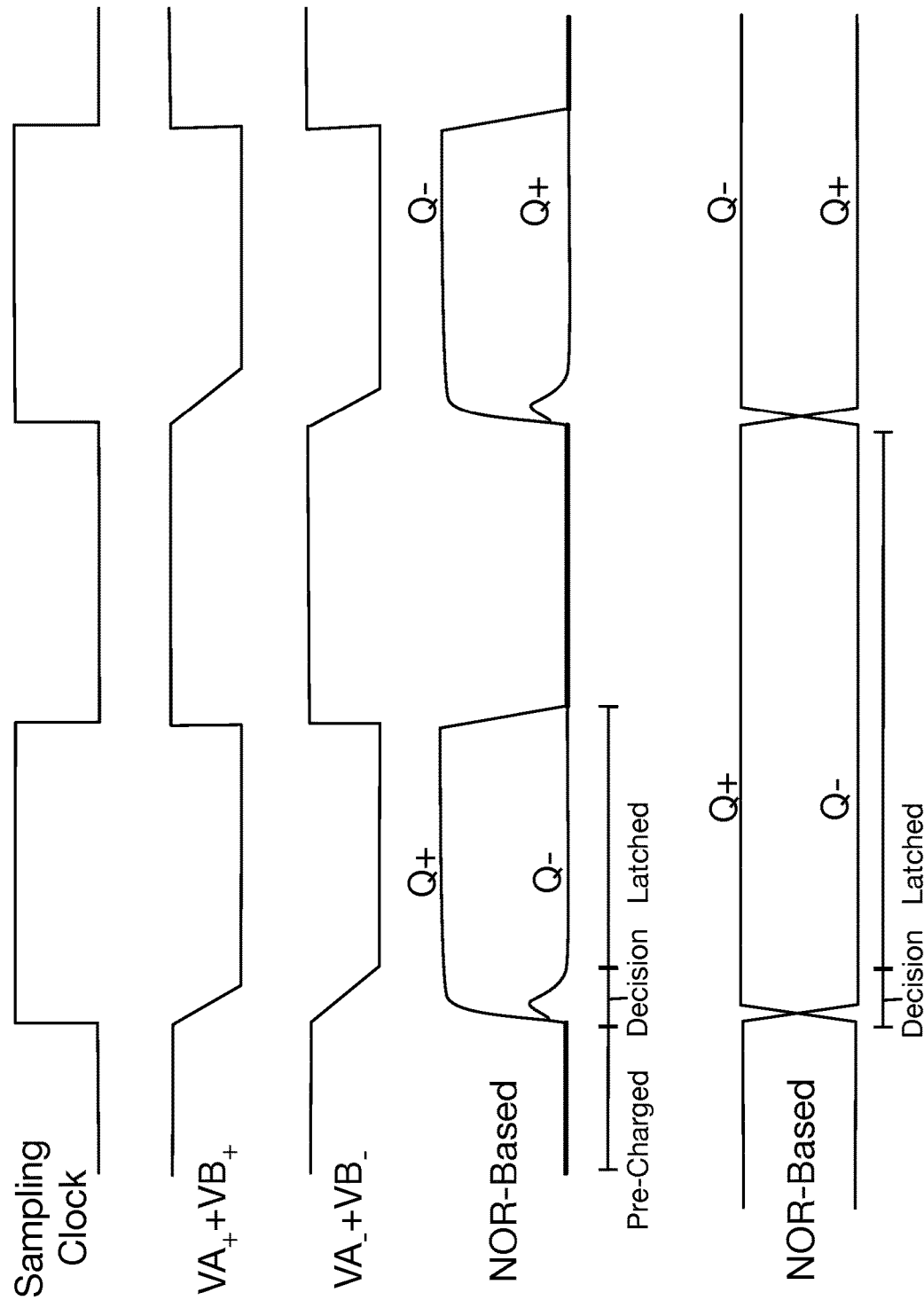
FIG. 12 is a timing diagram of data decisions made over two signaling intervals, in accordance with some embodiments.

FIG. 12 is a timing diagram illustrating two consecutive unit intervals in a circuit utilizing a NOR-based multi-input summation latch as shown in FIG. 5. As shown, a set of data signal nodes holding VA+/− and a set of DFE correction signal nodes holding VB+/− are pre-charged, and the outputs Q+/Q− of NOR-based multi-input summation latch 630 are held in a pre-charged state '00'. In response to the rising edge of the sampling clock, a differential data voltage signal $VA_+/VA_-$ and an aggregate differential DFE correction signal $VB_+/VB_-$ are generated by discharging the respective sets of nodes according to the received differential input voltage Vin+/Vin− and the summation of the plurality of DFE correction factors H_2 . . . H_10. A data decision is generated by driving the differential output Q+/Q− of multi-input summation latch 630 to one of two possible states according to the summation of the differential data voltage signal and the aggregate differential DFE correction signal. Specifically, as each set of nodes begin discharging and the voltages on the nodes responsively begin decreasing, the values of Q+/Q− begin to increase as the NMOS transistors connected to $VA_+/-$ and $VB_+/-$ begin to turn off, and the PMOS transistors begin turning on. In the first unit interval of FIG. 12, the summation $VA_++VB_+$ is falling at a faster rate than the summation $VA_-+VB_-$, and thus Q+ begins to increase faster than Q−. At a certain threshold, the feedback of Q+ forces Q− to subsequently decrease, and a data decision is thus formed in which Q+='1' and Q−='0'. The values $(VA_++VB_+)$ and $(VA_-+VB_-)$ continue to decrease due to the discharging of the sets of nodes at the discrete time integrator until the input state to the multi-input summation latch is '00', which in Table I above causes the differential output state of Q+/Q− to be held at '10', until the sampling clock experiences the subsequent falling edge, in which case the sets of nodes are pre-charged for the next sampling interval. In response to pre-charging the sets of nodes, the differential output Q+/Q− is held in the pre-charged state. The second unit interval of FIG. 12 is similar to the first unit interval, however the summation of VA_+VB_ discharges faster than VA_++VB_+).

Figure 14:
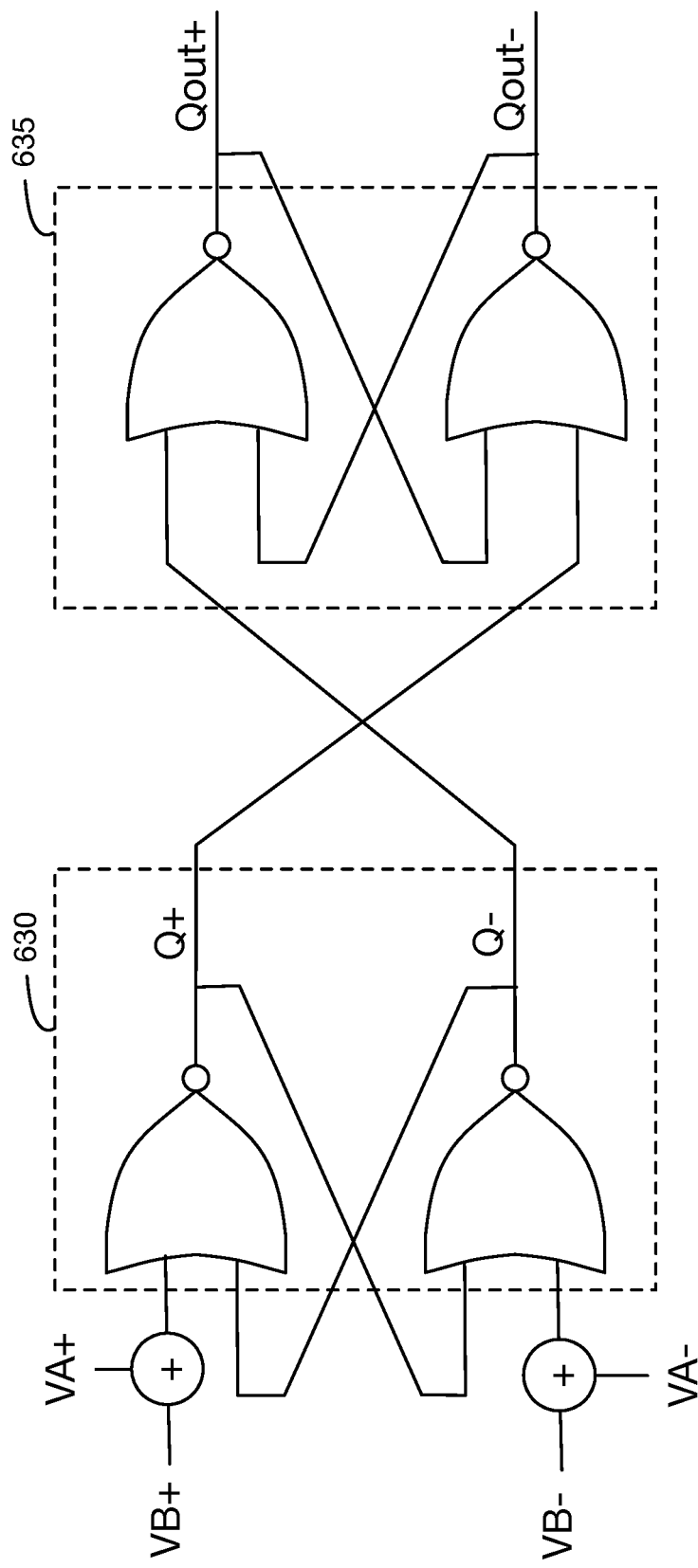
FIG. 14 is a block diagram illustrating a configuration of a NOR-based multi-input summation latch being connected to a NOR-based latch to extend hold time, in accordance with some embodiments.

In some embodiments, multi-input summation latches 630 and 640 are followed by known art cross-coupled NOR-based set/reset latches 635 and 645 as shown, to extend the hold time of the results. An exemplary configuration is shown in FIG. 14. As shown in FIG. 14, the outputs of NOR-based multi-input summation latch 630 are cross-coupled and provided to NOR-based latch 635. As described above with respect to FIG. 12, pre-charging the inputs of the NOR-based multi-input summation latch forces the differential output Q+/Q− to a pre-charged state of '00', which in turn is the input condition for a "Latched" state for a NOR-based multi-input summation latch as shown in Table I. By providing the differential outputs Q+/Q− as inputs to NOR-based latch 635, the data decision may be held for an entire clock period. Thus, the outputs Qout+/Qout− of NOR-based latch 635 will only change according to the data-decisions made by multi-input summation latch 630, and will subsequently be held until the next rising edge of the sampling clock, as illustrated in FIG. 12.

In some embodiments, unbuffered CMOS inverters (not shown) are inserted into each of the differential inputs to the multi-input summation latches 630 and 640. In such embodiments, the NAND-based multi-input summation latch shown in FIG. 11 may be used, as the pre-charged state '00' is used, and when the inverted inputs reach '11', the intermediate data decision is held.

In alternative embodiments, the MOSFET structure of FIGS. 3 and 4 may be reversed, and a current source may be used to charge a pair of pre-discharged nodes. In such an embodiment, the nodes would be initially discharged to a '00' state, and in response to the sampling clock, the nodes may begin charging according to a current source up to values of '11'. In such an embodiment, the differential data voltage and aggregate DFE correction signals may be applied directly to the NAND-based multi-input summation latch, or alternatively to a NOR-based multi-input summation latch via CMOS inverters, similarly as described above.

It should be noted that various configurations of discrete integrators 310 and 330 may be used and connected to various types of multi-input summation latches via different configurations of CMOS inverters. For example, in FIG. 6, CMOS inverters (not shown) may be included at the inputs of the multi-input summation latches 630 and 640, which in such an embodiment may be NAND-based multi-input summation latches due to the reversal of the input conditions for the pre-charged state and latched state given in Tables I and II above. Such a design may be advantageous to provide system isolation between the multi-input summation latches and the discrete time integrators 310 and 320. It should be noted that such CMOS inverters may introduce additional gain, which may compensated for e.g., by adjusting rates of discharge in the discrete time integrators producing VA+/− and VB+/−.

Figure 7:
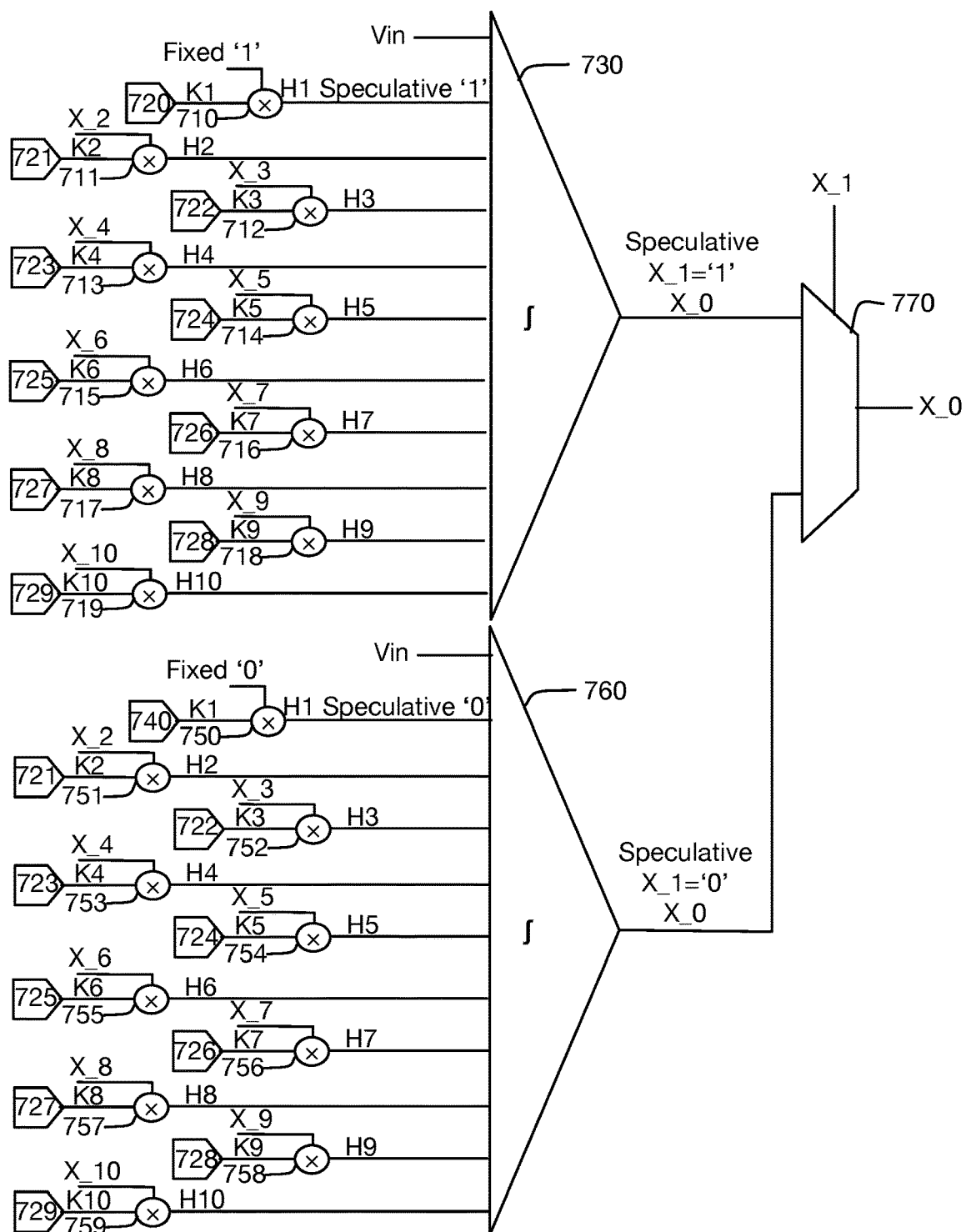
FIG. 7 shows a further embodiment of one parallel processing stage.
Figure 8:
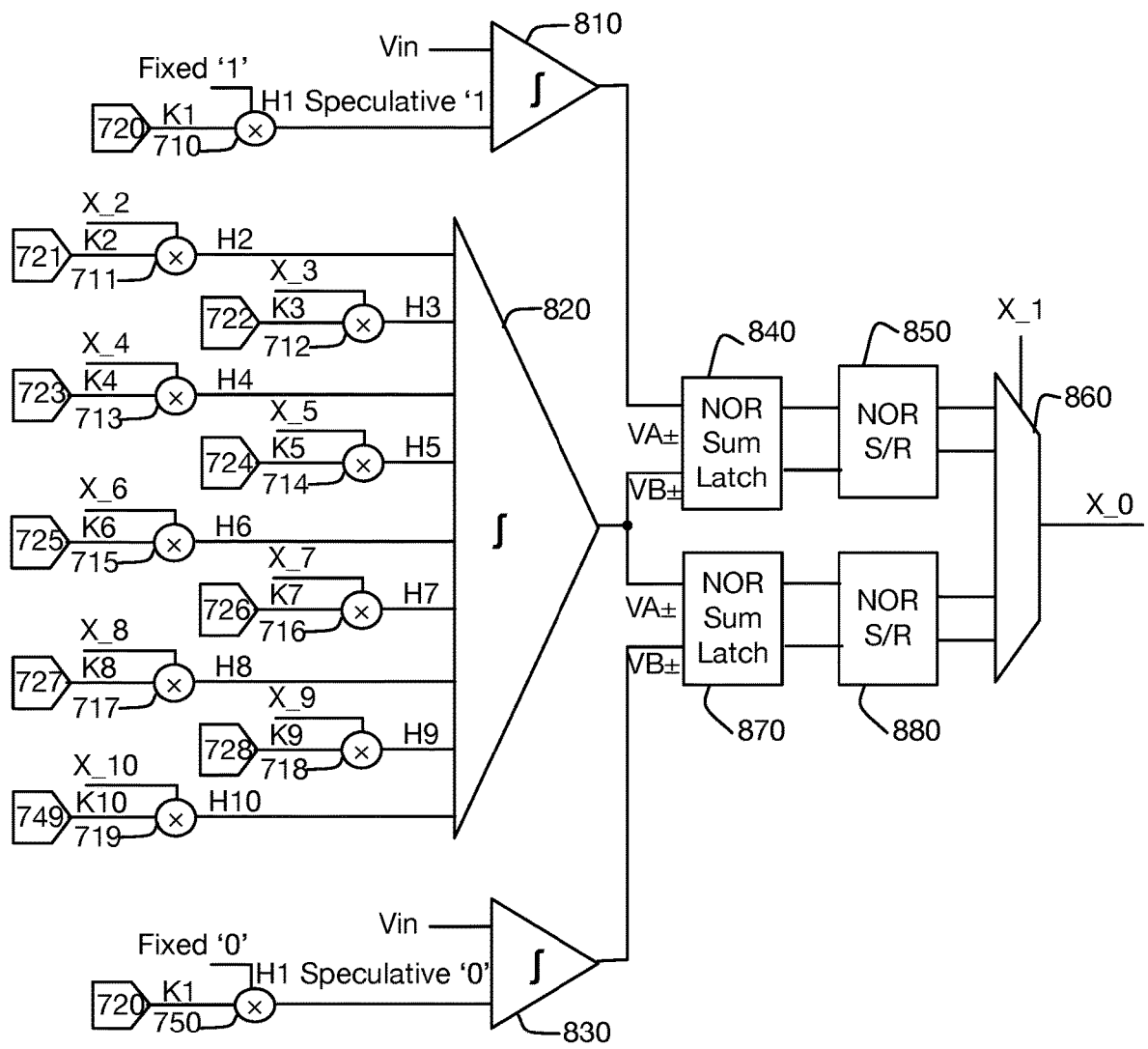
FIGS. 8 and 9 show two further embodiments of one parallel processing stage.

The above-described examples do not describe the use of the speculative DFE terms H_1+/−, however it should be noted that the speculative DFE terms may still be incorporated in the configurations shown in any of FIGS. 3 and 6-10. That is to say that the speculative DFE terms may be introduced in various different stages, and operation of the multi-input summation latches and any subsequent latching devices would remain the same. For example, the speculative DFE terms may be applied to the received differential input voltage Vin and may be part of VA+/VA−, as shown in FIG. 8, or alternatively the speculative DFE terms may be applied to the historical DFE correction factors and thus are included into VB+/VB−, such as in the configuration shown in FIG. 9.

The clocked sampler function is performed by input summers 610 and 620, which as in the previous example may utilize circuit 310 of FIG. 3. The DFE correction factor K1 used for the loop-unrolled or speculative correction corresponding to the X_1 data value is shown as being obtained separately as a positive (i.e. corresponding to a speculative '1' value for X_1) factor from DAC 660 as an input to 610, and as a negative (i.e. corresponding to a speculative '0' value for X_1) factor from DAC 661 as an input to 640. In other embodiments, a single DAC may source a K1 factor for both speculative options, as previously described.

FIG. 7 illustrates the overall processing occurring in the described embodiments. Each DFE correction factor $H_N$ (in this example, with N=1 . . . 10) is obtained by multiplication of a correction factor $K_N$ by a corresponding historical data value X_N. Thus, as one example DAC 721 is shown as being configured to produce correction factor K2, which is multiplied 711 by historical data value X_2 to produce DFE correction term H2 for sampler 730. Separate samplers 730 and 760 are shown for detection under the speculative assumptions that the previous unit interval data X_1 was a '1' (for 730) or was a '0' (for 760.) For generality, separate generation of input correction terms are shown for 730 and 760, differing only in the assumed value of the H1 correction term. As shown, the values from DACs 721-729 may be shared between 730 and 760, however each sampler 730 and 760 utilizes separate multipliers. As shown, sampler 730 has a set of multipliers 710-719 while sampler 760 includes multipliers 750-759. Each multiplier may be a configuration of transistors as shown in FIG. 4. As in previous examples, multiplexer 770 is shown as selecting the valid speculative detected value.

FIGS. 8 and 9 show two further embodiments similar to that of FIG. 7, with the summation and integration-and-sample operations in different arrangements so as to highlight different operational aspects of the described embodiments.

In FIG. 8, all of the non-speculative DFE correction terms are summed 820 and this combined correction is combined with the sum of input signal Vin and the speculative DFE correction 810 within multi-input summation latch 840. A similar combination is made between the combined correction 820 and the sum of Vin and the complementary speculative correction 830 within multi-input summation latch 870. The multi-input summation latches 840 and 870 perform multiple functions: separately summing the positive and negative differential input signals (e.g. Vin plus speculative DFE+summed DFE) and capturing which sum is more negative. The resulting differential outputs of 840 and 870 are then latched by conventional latches 850 and 880.

As previously described, multiplexer 860 chooses one of the two speculative results, based on the actual data value previously received. Sharing of the summed non-speculative corrections between the speculative samplers reduces circuit complexity, while allowing significant gain to be applied to the few inputs needed for samplers 810 and 830. In one embodiment, 810 and 830 provide a gain of ×6 for Vin, and a gain of ×3 for the speculative H1 term.

All illustrated integrate-and-hold samplers utilize the same basic designs previously described. In one embodiment, the design of 810 and 830 follows that of 330 in FIG. 3, and 820 follows that of FIG. 4. Multi-input summation latch embodiments 840 and 870 are as shown in FIG. 5, with the subsequent latches 850 and 880 being known art cross coupled NOR-gate set/reset latches, as shown in the configuration of FIG. 14. As previously described, unbuffered CMOS inverters may alternatively be inserted into each of the differential inputs to the dual input summation latches and the alternative circuit of FIG. 11 may be used instead.

FIG. 9 shows a further variation on the designs of FIGS. 7 and 8. In FIG. 9 all speculative and non-speculative DFE correction terms are separately summed, 920 for the sum including the speculative X_1='1' term, and 930 including the speculative X_1='0' term. These summed corrections and amplified input signal 910 are combined by dual input summation latches 940 (for speculative 1) and 970 (for speculative 0), producing threshold comparison results which are then latched by 950 and 980, with multiplexer 960 choosing the correct speculative result. The gain of integrate-and-sample stage 910 can be higher as it has only a single input; one embodiment achieves a Vin gain of ×9 in this stage by utilizing nine paralleled differential transistor pairs for Vin. A further embodiment similarly incorporates a gain of ×6 for the speculative DFE correction term.

As in the previous example, unbuffered CMOS inverters may be are inserted into each of the differential inputs to the dual input summation latches and the alternative circuit 1100 of FIG. 11 used instead of FIG. 5.

The embodiments of FIGS. 7, 8, 9 share the common advantage of having only a single clocked sampling operation occurring essentially simultaneously on all input terms. This can be of significant value in applications where skew among those signals is problematic.

FIG. 10 shows a system embodiment incorporating the described elements. The paralleled differential pair elements used for gain adjustment among the various signal paths are shown explicitly, while the summation operations illustrated in e.g. FIG. 8 as elements 810, 820, 830 are shown using a data flow notation, in which each separate summation is drawn as a summation bus. Each such summation is comprised of the same number of differential pair elements, in this non-limiting example nine, with this consistent loading leading to reduced skew among the various summed results. This reduced skew is advantageous in inputs to dual input summation latches such as shown in FIG. 5, as their result is determined by the first of summations (A+ summed with B+) or (A− summed with B−) to fall below the other summation.

Figure 15:
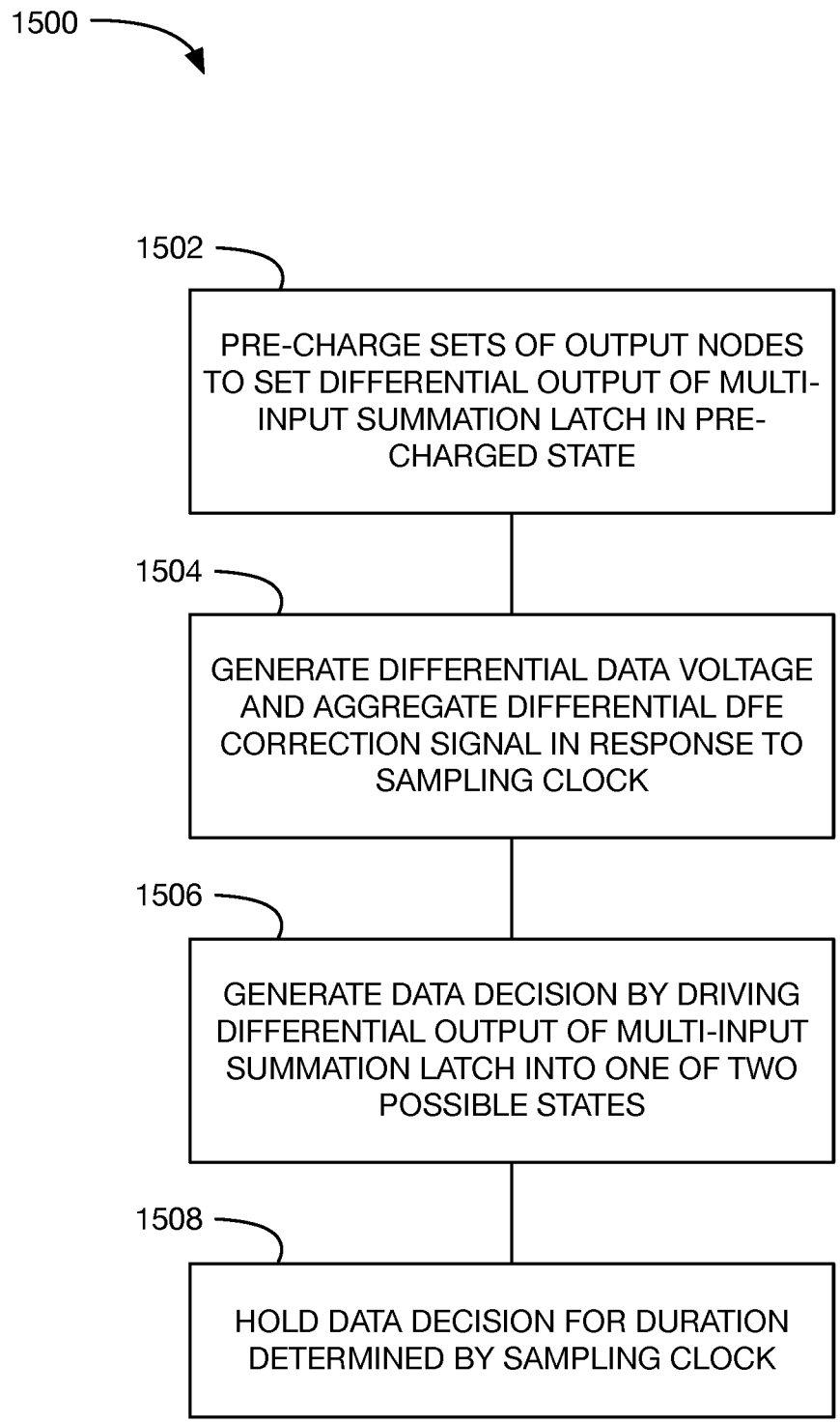
FIG. 15 is a flowchart of a method, in accordance with some embodiments.

FIG. 15 is a flowchart of a method 1500, in accordance with some embodiments. As shown, method 1500 includes pre-charging 1502 two or more sets of nodes to set a differential output of a multi-input summation latch connected to the two or more sets of nodes in a pre-charged state, the two or more sets of nodes comprising (i) a set of data signal nodes and (ii) a set of DFE correction nodes. At step 1504, in response to a sampling clock, a differential data voltage signal is generated by discharging the set of data signal nodes according to a received differential input voltage signal and an aggregate differential DFE correction signal is generated by discharging the set of DFE correction nodes according to a summation of a plurality of DFE correction factors. At 1506 a data decision is generated by driving the differential output of the multi-input summation latch into one of two possible output states according to a summation of the differential data voltage signal and the aggregate differential DFE correction signal. The data decision is subsequently held 1508 by holding the differential output of the multi-input summation latch in a latched state for a duration determined by the sampling clock.

In some embodiments, the method further includes generating a pair of differential speculative DFE terms: +H1 and −H1. In such embodiments, each differential speculative DFE term of the pair of differential speculative DFE terms may be separately applied to the summation of the differential data voltage signal and the aggregate differential DFE correction signal to generate a pair of speculative data decisions. In such embodiments, generating the data decision includes selecting one of the pair of speculative data decisions in response to a previous data decision.

In some embodiments, the differential speculative DFE terms are applied to the summation via the differential data voltage signal, while alternative embodiments may apply the differential speculative DFE terms to the summation via the differential DFE correction signal. FIGS. 6-10 illustrate various configurations for applying speculative DFE terms.

In some embodiments, the method further includes providing the data decision to a second latch, e.g., latch 635/645, the second latch configured to provide the data decision as an output for an entire signaling interval. In some embodiments, the differential data voltage signal and the aggregate differential DFE correction signal are buffered by one or more CMOS inverters.

In some embodiments, the set of data signal nodes are connected to an output of a first amplification stage 241/243 and wherein the set of DFE correction nodes are connected to a second amplification stage 248. In such embodiments, the method further includes applying a gain to the received differential input voltage signal via the first amplification stage by generating a plurality of currents in parallel via a plurality of differential transistor pairs connected in parallel, each differential transistor pair of the plurality of differential transistor pairs receiving the differential input voltage signal, the applied gain representing a discharge rate of the set of data signal nodes. As shown in FIG. 10, the first amplification stage may include six identical current-mode output samplers connected in parallel for providing a gain of six to the differential input voltage signal Vin. In such embodiments, each identical current-mode output samplers may comprise a differential pair of transistors receiving the differential input voltage signal, and generating a current provided to a common node to perform an analog summation.

In some embodiments, the summation of the differential data voltage signal and the aggregate differential DFE correction signal is generated by providing like-polarity terms of the differential voltage signal and the aggregate differential DFE correction signal to corresponding transistors in respective transistor pairs connected in parallel, the transistors in each transistor pair providing respective currents that add via a common node connecting the transistors in the transistor pair. As shown in FIG. 5, VA+ is added to VB+, while VA− is added to VB−, by connecting the differential data voltage signal and aggregate differential DFE correction signal to parallel-connected transistors that are grouped according to like-polarity terms.

For descriptive convenience, the above examples suggest that DACs permit the configuration or adjustment of the described control signals or levels. DACs may utilize binary R-2R resistive ladders, unary resistive chains, binary weighted resistor or capacitor summation, or other methods known to the art. Other embodiments may utilize other known art methods of producing configurable or adjustable output signal levels, including configurable current sources, adjustable resistive or capacitive constraints on signal output, and selective enabling of numbers of paralleled driver elements each incrementally contributing to the output signal level.

To clearly illustrate all elements of the described embodiments, two essentially parallel processing phases each performing one stage of speculative DFE are described. No limitation is implied, with the described elements equally applicable to embodiments incorporating greater or fewer numbers of parallel processing phases. Similarly, no limitation to a single stage of speculative DFE is implied, with the described elements equally applicable to embodiments incorporating additional stages of speculative DFE, or no speculative or loop-unrolled DFE at all.

I claim:

1. A method comprising:
generating a weighted differential data voltage signal from a differential input voltage signal applied to an integration circuit connected to a pair of data signal nodes;
generating, according to a summation of a plurality of decision feedback equalization (DFE) correction factors, an aggregate differential DFE correction voltage signal, each DFE correction factor having a polarity determined by a corresponding historical data decision of a plurality of historical data decisions, the corresponding historical data decision applied to a respective differential pair connected in parallel to a pair of DFE correction nodes;
applying the weighted differential data voltage signal and the aggregate differential DFE correction voltage signal to respective inputs of a multi-input summation latch, the respective inputs connected in parallel to form a combined differential current on a differential output of the multi-input summation latch; and
latching an output data decision at the differential output of the multi-input summation latch responsive to a cross-coupled voltage differential on the differential output generated by the combined differential current.

2. The method of claim 1, further comprising generating a pair of differential speculative DFE terms.

3. The method of claim 2, wherein the pair of differential speculative DFE terms are separately applied to one of the weighted differential data voltage signal or the aggregate differential DFE correction voltage signal.

4. The method of claim 3, further comprising selecting the output data decision from a pair of differential outputs generated by a pair of multi-input summation latches, the output data decision selected responsive to completion of a historical data decision of the plurality of historical data decisions.

5. The method of claim 2, wherein the weighted differential data voltage signal has a relative gain of 6×, the pair of differential speculative DFE terms have relative gains of 3×, and wherein each DFE correction factor has a relative gain of 1×.

6. The method of claim 1, wherein generating the weighted differential data voltage signal comprises applying the differential input voltage signal to a plurality of differential pairs connected in parallel to the pair of data signal nodes.

7. The method of claim 1, further comprising providing the output data decision to a two-input latch, the two-input latch configured to provide the output data decision as an output for an entire signaling interval.

8. The method of claim 1, wherein the weighted differential data voltage signal and the aggregate differential DFE correction signal are buffered by one or more complementary metal oxide semiconductor (CMOS) inverters.

9. The method of claim 1, wherein the differential output is initially pre-charged with an amount of charge, and wherein generating the cross-coupled voltage differential comprises discharging charge from the differential output of the multi-input summation latch according to the combined differential current.

10. The method of claim 1, wherein the differential output is initially pre-discharged, and wherein generating the cross-coupled voltage differential comprises charging the differential output of the multi-input summation latch according to the combined differential current.

11. An apparatus comprising:
an integration circuit configured to receive a differential input voltage signal and to responsively generate a weighted differential data voltage signal on a pair of data signal nodes;
a plurality of differential pairs connected in parallel to a pair of decision feedback equalization (DFE) correction nodes, the plurality of differential pairs configured to generate, according to a summation of a plurality of DFE correction factors, an aggregate differential DFE correction voltage signal, each DFE correction factor having a polarity determined by a corresponding historical data decision of a plurality of historical data decisions, the corresponding historical data decision applied to a respective differential pair of the plurality of differential pairs; and
a multi-input summation latch configured to receive the weighted differential data voltage signal and the aggregate differential DFE correction voltage signal at respective inputs, the respective inputs connected in parallel to form a combined differential current on a differential output of the multi-input summation latch, the multi-input summation latch configured to latch an output data decision at the differential output responsive to a cross-coupled voltage differential on the differential output generated by the combined differential current.

12. The apparatus of claim 11, further comprising speculative integration stages configured to generate a pair of differential speculative DFE terms.

13. The apparatus of claim 12, wherein the pair of differential speculative DFE terms are separately applied to one of the weighted differential data voltage signal or the aggregate DFE correction signal.

14. The apparatus of claim 13, further comprising a selection circuit configured to select the output data decision from a pair of differential outputs generated by a pair of multi-input summation latches, the output data decision selected responsive to completion of a historical data decision of the plurality of historical data decisions.

15. The apparatus of claim 12, wherein the weighted differential data voltage signal has a relative gain of 6×, the pair of differential speculative DFE terms have relative gains of 3×, and wherein each DFE correction factor has a relative gain of 1×.

16. The apparatus of claim 11, wherein the integration stage comprises a plurality of differential pairs connected in parallel receiving the differential input voltage signal, the plurality of differential pairs configured to generate the weighted differential data voltage signal.

17. The apparatus of claim 11, further comprising a two-input latch configured to receive the output data decision and to hold the output data decision as an output for an entire signaling interval.

18. The apparatus of claim 11, further comprising one or more complementary metal oxide semiconductor (CMOS) inverters configured to buffer the weighted differential data voltage signal and the aggregate differential DFE correction signal.

19. The apparatus of claim 11, wherein the differential output of the multi-input summation latch is initially pre-charged with an amount of charge, and wherein the multi-input summation latch is configured to generate the cross-coupled voltage differential by discharging charge from the differential output according to the combined differential current.

20. The apparatus of claim 11, wherein the differential output is initially pre-discharged, and wherein the multi-input summation latch is configured to generate the cross-coupled voltage differential by charging the differential output according to the combined differential current.

\* \* \* \* \*